(12) United States Patent  
Aono et al.

(10) Patent No.: US 12,444,766 B2  
(45) Date of Patent: Oct. 14, 2025

(54) FUEL CELL STACK

(71) Applicant: TOYOTA BOSHOKU KABUSHIKI KAISHA, Aichi-ken (JP)

(72) Inventors: Haruyuki Aono, Aichi-ken (JP); Satoshi Kawabe, Ichinomiya (JP); Naohiro Matsubara, Takahama (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 496 days.

(21) Appl. No.: 18/111,297

(22) Filed: Feb. 17, 2023

(65) Prior Publication Data

US 2023/0268544 A1  Aug. 24, 2023

(30) Foreign Application Priority Data

Feb. 24, 2022 (JP) .................................. 2022-026999  
Feb. 24, 2022 (JP) .................................. 2022-027000

(51) Int. Cl.
*H01M 8/2483* (2016.01)  
*H01M 8/026* (2016.01)  
*H01M 8/1004* (2016.01)

(52) U.S. Cl.  
CPC ......... *H01M 8/2483* (2016.02); *H01M 8/026* (2013.01); *H01M 8/1004* (2013.01)

(58) Field of Classification Search  
CPC .................................................. H01M 8/2483  
See application file for complete search history.

(56) References Cited

U.S. PATENT DOCUMENTS

| 2009/0023026 A1 | 1/2009 | Chin et al. |
| 2013/0252130 A1 | 9/2013 | Ishida et al. |
| 2018/0154416 A1 | 6/2018 | Hirata |

(Continued)

FOREIGN PATENT DOCUMENTS

| JP | 2006-228533 | 8/2006 |
| JP | 2006-309989 | 11/2006 |
| JP | 2009-26727 | 2/2009 |

(Continued)

OTHER PUBLICATIONS

Japan, Notice of Reasons for Refusal received in Japanese Patent Application No. 2022-026999, dated Jul. 1, 2025, and English language translation thereof.

(Continued)

*Primary Examiner* — Brian R Ohara  
(74) *Attorney, Agent, or Firm* — GREENBLUM & BERNSTEIN, P.L.C.

(57) ABSTRACT

A fuel cell stack includes single cells stacked in a first direction. Each single cell includes a power generating unit, a first separator, and a second separator. The first separator and the second separator hold the power generating unit between the first separator and the second separator. The first separator of each single cell includes first protrusions. The second separator of each single cell includes second protrusions. A distal end of each second protrusion includes a depression that is located at a center in a second direction and extends in a third direction. A length of the depression in the second direction is greater than a length of the first protrusion in the second direction. A distal end of each first protrusion is located inside the depression.

10 Claims, 7 Drawing Sheets

(56) References Cited

U.S. PATENT DOCUMENTS

2020/0153000 A1* 5/2020 Stöhr ................. H01M 8/0258

FOREIGN PATENT DOCUMENTS

| JP | 2013-201091 | 10/2013 |
|----|-------------|---------|
| JP | 2018-60741  | 4/2018  |
| JP | 2018-089679 | 6/2018  |
| JP | 2020-522089 | 7/2020  |

OTHER PUBLICATIONS

Japan, Notice of Reasons for Refusal received in Japanese Patent Application No. 2022-027000, dated Jul. 1, 2025, and English language translation thereof.

* cited by examiner

FUEL CELL STACK

BACKGROUND

1. Field

The present disclosure relates to a fuel cell stack.

2. Description of Related Art

Japanese National Phase Laid-Open Patent Publication No. 2020-522089 discloses a fuel cell stack. The fuel cell stack includes multiple single cells stacked together. Each single cell includes two separators. Each single cell includes a membrane electrode assembly and two gas diffusion layers disposed between the two separators. The gas diffusion layers sandwich the membrane electrode assembly in the stacking direction of the single cells.

Each separator includes a facing surface, which faces a gas diffusion layer. The facing surface has groove-shaped passages for conducting a reaction medium. Each separator includes groove-shaped passages in an opposite surface located on a side opposite to the facing surface. The passages in the opposite surfaces of single cells adjacent to each other form cavities between the separators. The cavities conduct a cooling medium.

Each separator includes a protruding bead and a recess portion on the facing surface. The recess portion is disposed between the bead and a passage.

The bead is provided over the entire periphery of the passages.

The bottom walls of the recess portions formed in the respective separators are in contact with each other (refer to FIG. 6A of Japanese National Phase Laid-Open Patent Publication No. 2020-522089).

In the fuel cell stack including such separators, the recess portions in contact with each other prevent the cooling medium flowing through the cavity from flowing toward the bead. That is, the recess portions prevent the so-called side flows.

Japanese Laid-Open Patent Publication No. 2018-89679 discloses a method of forming a separator for a fuel cell from a metal plate. In this forming method, continuous bulges, which are passages of a separator, are formed between recesses and projections of a fixed die and projections and recesses of a movable punch. The recesses of the die and the punch each have a bottom that has a convex central portion. Accordingly, the central portion of the formed bulge is curved in a concave shape.

When the forming method disclosed in, for example, Japanese Laid-Open Patent Publication No. 2018-89679 is used to form the separator for a fuel cell disclosed in Japanese National Phase Laid-Open Patent Publication 2020-522089, the following problem occurs. The central portions of the facing surfaces of the bottom walls of the recess portions are curved in concave shapes. This creates a gap between the bottom walls of the recess portions of the separators. As a result, cooling medium that flows sideways from the cavity leaks out through the gap, reducing the side flow limiting effect of the recess portions. This may reduce the cooling efficiency of the cooling medium and thus reduce the power generation efficiency of the fuel cell.

Such a problem is not limited to the case of using the forming method disclosed in Japanese Laid-Open Patent Publication No. 2018-89679. For example, the same problem may occur if the bottom wall of a recess portion has a depression in the bottom wall due to molding shrinkage or the like.

SUMMARY

Accordingly, it is an objective of the present disclosure to provide a fuel cell stack capable of limiting side flows of a cooling medium.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, a fuel cell stack includes single cells stacked in a first direction. Each single cell includes a power generating unit, a first separator, and a second separator. The first separator and the second separator hold the power generating unit between the first separator and the second separator. The first separator and the second separator each include a facing surface that faces the power generating unit, and an opposite surface that is located on a side opposite to the facing surface. The opposite surface of the first separator and the opposite surface of the second separator are each provided with groove passages that extend in a second direction. A cooling medium flows through the groove passages. The first separator of each single cell includes first protrusions that protrude toward the second separator of another single cell that is adjacent in the first direction. The first protrusions abuts the second separator. The groove passages include groove passages that are located at outermost positions in a third direction. The third direction intersects with both of the first direction and the second direction. The first protrusions are provided on an outer side of at least one of the groove passages that are located at the outermost positions in the third direction. The first protrusions are arranged side by side in the second direction. The second separator of each single cell includes second protrusions that abut the first protrusions of another single cell that is adjacent. The second protrusions each protrude toward the corresponding one of the first protrusions in the first direction. A distal end of each second protrusion includes a depression that is located at a center in the second direction and extends in the third direction. A length of the depression in the second direction is greater than a length of the first protrusion in the second direction. A distal end of each first protrusion is located inside the depression.

In a second general aspect, a fuel cell stack includes single cells stacked in a first direction. Each single cell includes a power generating unit, a first separator, and a second separator. The first separator and the second separator hold the power generating unit between the first separator and the second separator. The first separator and the second separator each include a facing surface that faces the power generating unit, and an opposite surface that is located on a side opposite to the facing surface. The opposite surface of the first separator and the opposite surface of the second separator are each provided with groove passages that extend in a second direction. A cooling medium flows through the groove passages. The first separator of each single cell includes first protrusions that protrude toward the second separator of another single cell that is adjacent in the first direction. The first protrusions abuts the second separator. The groove passages include groove passages that are located at outermost positions in a third direction. The third direction intersects with both of the first direction and the second direction. The first protrusions are provided on an outer side of at least one of the groove passages that are located at the outermost positions in the third direction. The first protrusions are arranged side by side in the second direction. The second separator of each single cell includes second protrusions that abut the first protrusions of another single cell that is adjacent. The second protrusions each protrude toward the corresponding one of the first protrusions in the first direction. A distal end of each first protrusion is provided with a first depression and two first bulges. The first depression is located at a center in the second direction and extends in the third direction. The two first bulges are located on opposite sides of the first depression in the second direction. A distal end of each second protrusion is provided with a second depression and two second bulges. The second depression is located at a center in the second direction and extends in the third direction. The two second bulges are located on opposite sides of the second depression in the second direction. Only one of the two second bulges is located inside the first depression.

In a third general aspect, a fuel cell stack includes single cells stacked in a first direction. Each single cell includes a power generating unit, a first separator, and a second separator. The first separator and the second separator hold the power generating unit between the first separator and the second separator. The first separator and the second separator each include a facing surface that faces the power generating unit, and an opposite surface that is located on a side opposite to the facing surface. The opposite surface of the first separator and the opposite surface of the second separator are each provided with groove passages that extend in a second direction. A cooling medium flows through the groove passages. The first separator of each single cell includes first protrusions that protrude toward the second separator of another single cell that is adjacent in the first direction. The first protrusions abut the second separator. The groove passages include groove passages that are located at outermost positions in a third direction. The third direction intersects with both of the first direction and the second direction. The first protrusions are provided on an outer side of at least one of the groove passages that are located at the outermost positions in the third direction. The first protrusions are arranged side by side in the second direction. The second separator of each single cell includes second protrusions that abut the first protrusions of another single cell that is adjacent. The second protrusions each protrude toward the corresponding one of the first protrusions in the first direction. A distal end of each first protrusion includes a depression that is located at a center in the second direction and extends in the third direction. A distal end of each second protrusion includes a projection. The projection is located inside the depression and projects toward a bottom surface of the depression.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Fuel cell stacks according to respective embodiments will now be described with reference to FIGS. 1 to 7. For illustrative purposes, some parts of the structures in the drawings are exaggerated or simplified, and the dimensional ratios of the structures may be different from the actual ratios. The term "orthogonal" is not necessarily used in a strict sense, but may be used in cases where elements are generally orthogonal to each other within ranges in which such configuration achieves the operational advantages of the respective embodiments.

First Embodiment

First the fuel cell stack according to the first embodiment will be described with reference to FIGS. 1 to 3.

Figure 1:
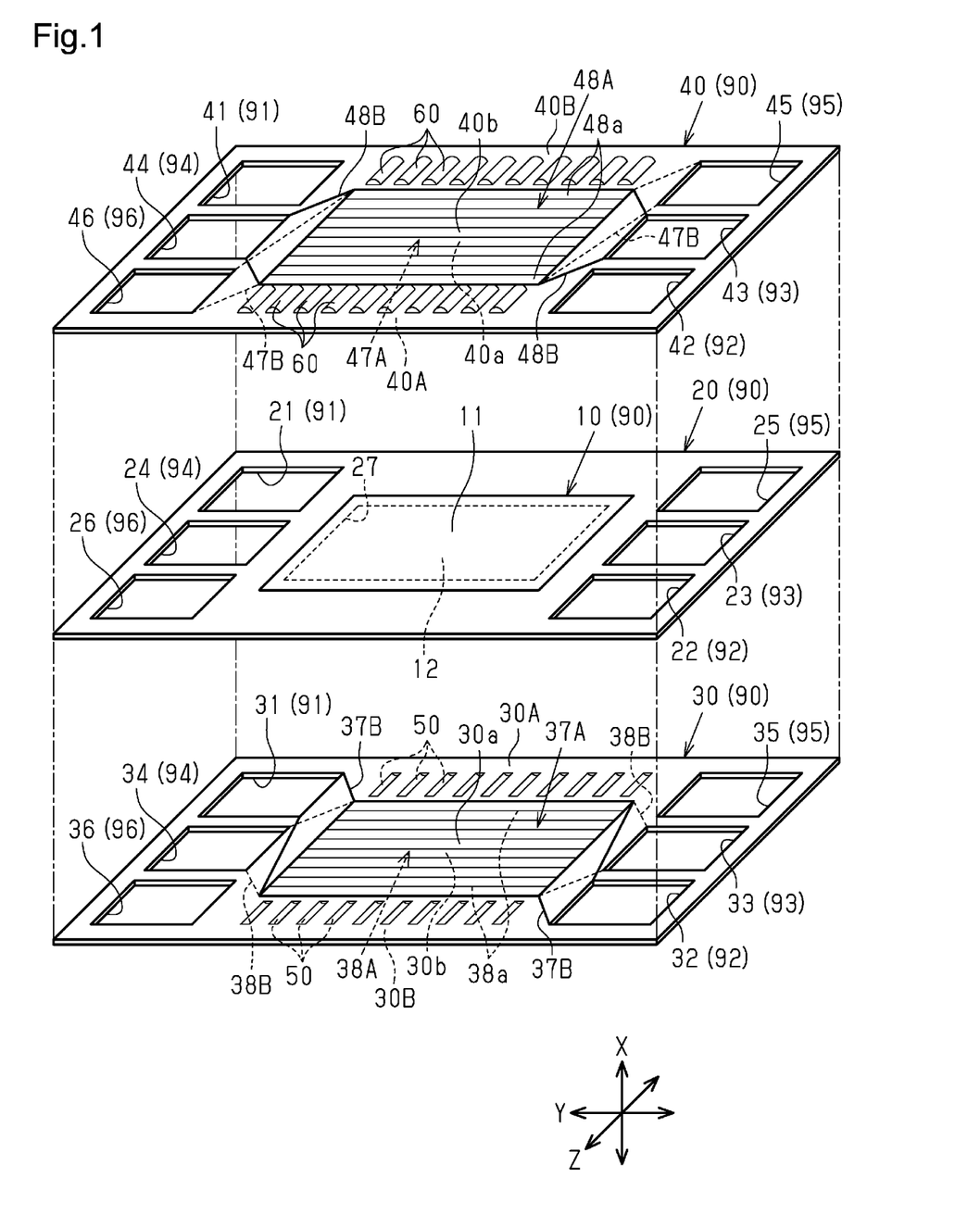
FIG. 1 is an exploded perspective view of a single cell for a fuel cell stack according to a first embodiment.
Figure 2:
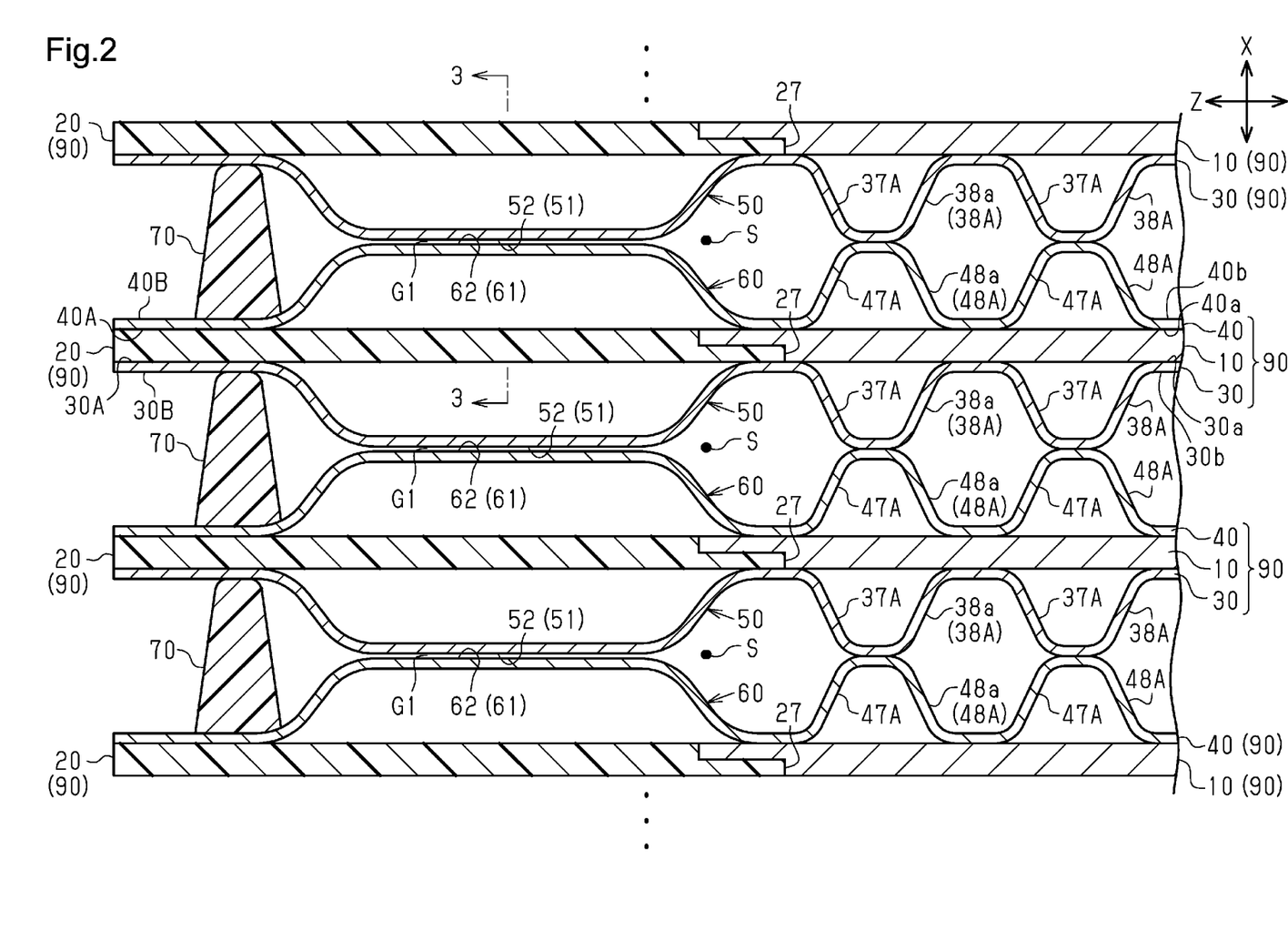
FIG. 2 is a cross-sectional view showing the fuel cell stack according to the first embodiment.

As shown in FIGS. 1 and 2, the fuel cell stack is formed by stacking multiple single cells 90 each having a rectangular plate-shape as a whole.

In the following description, the direction in which the single cells 90 are stacked will be referred to as a first direction X. Among directions orthogonal to the first direction X, a longitudinal direction of the single cell 90 will be referred to as a second direction Y. Also, a direction that is orthogonal to both the first direction X and the second direction Y will be referred to as a third direction Z.

The single cell 90 has inlet manifolds 91, 93, 95 for introducing reactant gas or cooling medium into the single cell 90 and outlet manifolds 92, 94, 96 for discharging the reactant gas and the cooling medium in the single cell 90 to the outside. In the present embodiment, the inlet manifold 91 and the outlet manifold 92 are manifolds through which fuel gas flows. The fuel gas is, for example, hydrogen gas. The inlet manifold 93 and the outlet manifold 94 are manifolds through which cooling medium flows. The cooling medium is, for example, coolant. The inlet manifold 95 and the outlet manifold 96 are manifolds through which oxidant gas flows. The oxidant gas is, for example, air.

The inlet manifolds 91, 93, 95 and the outlet manifolds 92, 94, 96 each have a rectangular shape in plan view, and extend in the first direction X through the single cell 90.

The inlet manifold 91 and the outlet manifolds 94, 96 are located on a first side in the second direction Y of the single cell 90 (on the left side in the left-right direction in FIG. 1). The inlet manifold 91 and the outlet manifolds 94, 96 are arranged in that order from a first side in the third direction Z (the back side of the sheet of FIG. 1) toward a second side in the third direction Z (the front side of the sheet of FIG. 1).

The outlet manifold 92 and the inlet manifolds 93, 95 are located on a second side in the second direction Y of the single cell 90 (on the right side in the in FIG. 1). The outlet manifold 92 and the inlet manifolds 93, 95 are arranged in that order from the second side in the third direction Z (the front side of the sheet of FIG. 1) toward the first side in the third direction Z (the back side of the sheet of FIG. 1).

The single cell 90 includes a membrane electrode assembly 10 (hereinafter, referred to as MEA 10), a frame member 20, which holds the MEA 10, a first separator 30, and a second separator 40. The separators 30, 40 hold the MEA 10 and the frame member 20 between them.

Each component will now be described.

<MEA 10>

As shown in FIG. 1, the MEA 10 includes a solid polymer electrolyte membrane (not shown; hereinafter referred to as an electrolyte membrane) and electrodes 11, 12 respectively provided on opposite surfaces of the electrolyte membrane. In the present embodiment, the electrode that is joined to a first side in the first direction X (the upper side in the up-down direction in FIG. 1) of the electrolyte membrane is a cathode 11. Also, the electrode joined to a second side in the first direction X (the lower side in the in FIG. 1) of the electrolyte membrane is an anode 12.

The electrodes 11, 12 each include a catalyst layer (not shown) joined to the electrolyte membrane and a gas diffusion layer (not shown), which is joined to the catalyst layer.

The MEA 10 corresponds to a power generating unit of the fuel cell according to the present disclosure.

<Frame Member 20>

As shown in FIGS. 1 and 2, the frame member 20 has a rectangular shape elongated in the second direction Y and is made of, for example, plastic.

The frame member 20 includes through-holes 21, 22, 23, 24, 25, 26, which are respective parts of the manifolds 91, 92, 93, 94, 95, 96.

The frame member 20 includes an opening 27 in a center. The MEA 10 is joined to the peripheral edge of the opening 27 from a first side in the first direction X (upper side as viewed in FIG. 1).

<First Separator 30>

As shown in FIGS. 1 and 2, the first separator 30 is formed by pressing, for example, a metal member that is made of titanium or stainless steel and has a rectangular shape in plan view.

The first separator 30 includes through-holes 31, 32, 33, 34, 35, 36, which are respective parts of the manifolds 91, 92, 93, 94, 95, 96.

The first separator 30 includes a first surface 30A and a second surface 30B. The first surface 30A includes a facing surface 30a, which faces the anode 12 of the MEA 10 in the first direction X. The second surface 30B includes an opposite surface 30b, which is located on a side opposite to the facing surface 30a.

The first surface 30A is provided with groove passages 37A, through which the fuel gas flows, and two connecting portions 37B. In FIG. 1, the groove passages 37A and the connecting portions 37B are illustrated in a simplified manner.

The groove passages 37A are provided in the facing surface 30a. Each of the groove passages 37A extends linearly in the second direction Y (refer to FIG. 1). The groove passages 37A are arranged side by side in the third direction Z while being spaced apart from each other (refer to FIG. 2).

As shown in FIG. 1, the two connecting portions 37B respectively extend from the opposite sides of the groove passages 37A in the second direction Y toward the through-holes 31, 32. The fuel gas is introduced from the inlet manifold 91 to the groove passages 37A via one of the connecting portions 37B. The fuel gas flowing through the groove passages 37A is discharged to the outlet manifold 92 via the other connecting portion 37B.

As shown in FIGS. 1 and 2, the second surface 30B is provided with groove passages 38A and two connecting portions 38B, through which the cooling medium flows, and first protrusions 50. In FIG. 1, the groove passages 38A and the connecting portions 38B are illustrated in a simplified manner.

The groove passages 38A are provided in the opposite surface 30b. Each of the groove passages 38A extends linearly in the second direction Y (refer to FIG. 1). The groove passages 38A are arranged side by side in the third direction Z while being spaced apart from each other (refer to FIG. 2).

As shown in FIG. 2, each groove passage 37A is formed by the back side of the protrusion positioned between two groove passages 38A adjacent to each other in the third direction Z. Also, each groove passage 38A is formed by the back side of the protrusion positioned between two groove passages 37A adjacent to each other in the third direction Z.

As indicated by broken lines in FIG. 1, the two connecting portions 38B respectively extend from the opposite sides of the groove passages 38A in the second direction Y toward the through-holes 33, 34. The cooling medium is introduced from the inlet manifold 93 to the groove passages 38A via one of the connecting portions 38B. The cooling medium flowing through the groove passages 38A is discharged to the outlet manifold 94 via the other connecting portion 38B.

<First Protrusions 50>

As shown in FIGS. 1 and 2, the first protrusions 50 are provided on the outer sides of two outer-side groove passages 38a, which are the outermost groove passages 38A in the third direction Z. In the present embodiment, the first protrusions 50 are provided on the outer sides of the respective outer-side groove passages 38a (refer to FIG. 1). The outer side in the third direction Z refers to a side away from the center of the single cell 90 in the third direction Z. FIG. 2 illustrates the outer-side groove passage 38a located on the first side in the third direction Z (the back side of the sheet of FIG. 1) of the two outer-side groove passages 38a and the first protrusions 50 located on the outer side of that outer-side groove passage 38a.

The first protrusions 50 protrude from the single cell 90 toward the second separator 40 of another single cell 90 that is adjacent in the first direction X (see FIG. 2).

The first protrusions 50 extend in the third direction Z.

As shown in FIG. 1, the first protrusions 50 are arranged side by side in the second direction Y while being spaced apart from each other. The first protrusions 50 are provided over the entire range in which the outer-side groove passage 38a is formed in the second direction Y.

Figure 3:
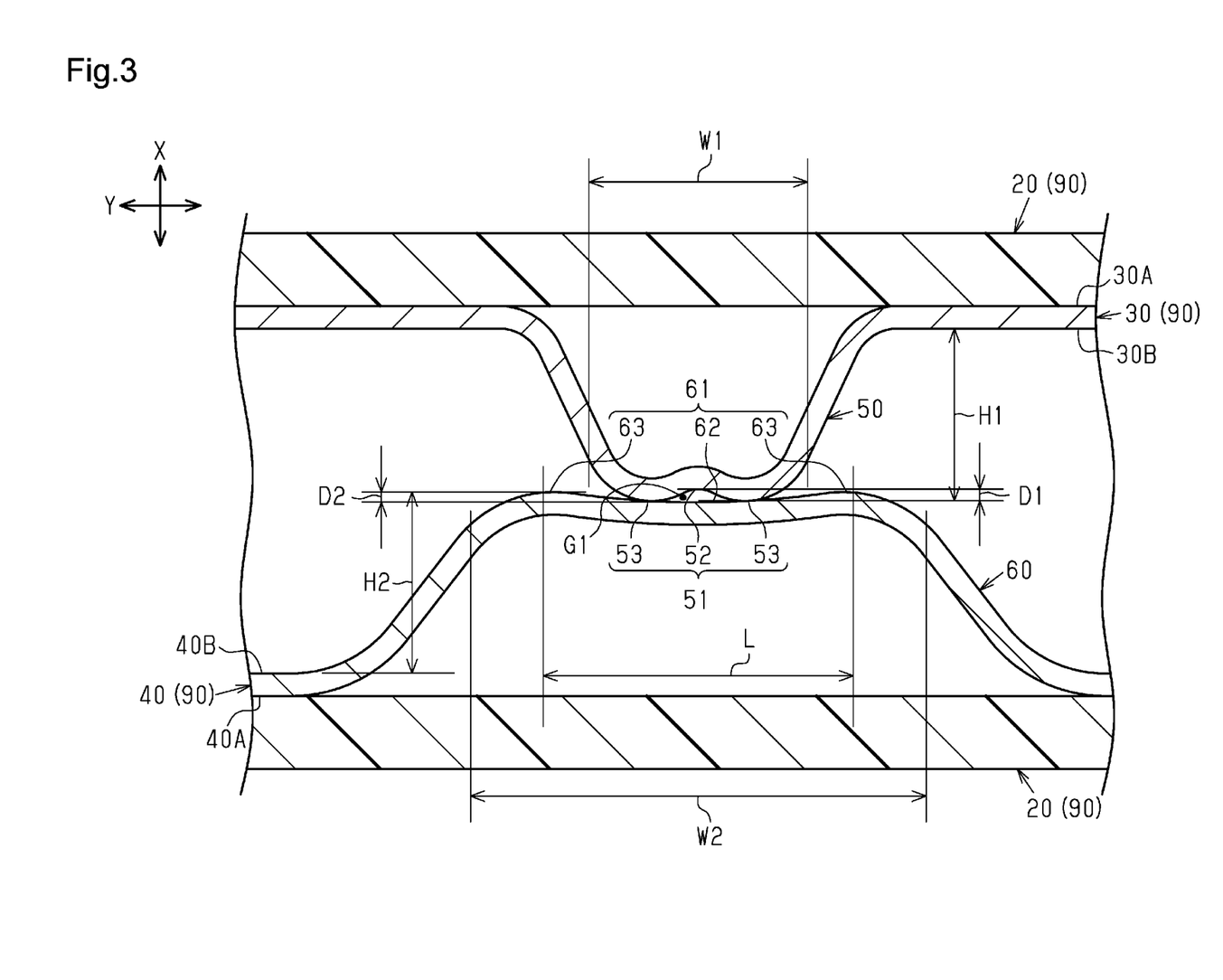
FIG. 3 is a cross-sectional view taken along line 3-3 of FIG. 2.

As shown in FIG. 3, a distal end 51 of each first protrusion 50 includes a first depression 52 and two first bulges 53.

The first depression 52 is located at a center of the distal end 51 in the second direction Y.

As shown in FIG. 2, the first depression 52 extends in the third direction Z.

As shown in FIG. 3, the first depression 52 is curved with respect to an imaginary straight line (not shown) extending in the second direction Y in a cross-sectional view.

The two first bulges 53 are located on the opposite sides of the first depression 52 in the second direction Y.

A height H1 of the first protrusion 50 in the first direction X is in a range of 0.2 mm to 0.8 mm in the present embodiment.

A length of the distal end 51 in the second direction Y (hereinafter, referred to as a width W1) is set to 1 mm in the present embodiment. The width W1 corresponds to a length of a first protrusion in the second direction Y according to the present disclosure.

A depth D1 of the first depression 52 in the first direction X is in a range of 10 μm to 50 μm in the present embodiment.

<Second Separator 40>

As shown in FIGS. 1 and 2, the second separator 40 is formed by pressing, for example, a metal member that is made of titanium or stainless steel and has a rectangular shape in plan view.

The second separator 40 includes through-holes 41, 42, 43, 44, 45, 46, which are respective parts of the manifolds 91, 92, 93, 94, 95, 96.

The second separator 40 includes a first surface 40A and a second surface 40B. The first surface 40A includes a facing surface 40a, which faces the cathode 11 of the MEA 10 in the first direction X. The second surface 40B includes an opposite surface 40b, which is located on a side opposite to the facing surface 40a.

The first surface 40A is provided with groove passages 47A and two connecting portions 47B, through which the oxidant gas flows. In FIG. 1, the groove passages 47A and the connecting portions 47B are illustrated in a simplified manner.

The groove passages 47A are provided in the facing surface 40a. Each of the groove passages 47A extends linearly in the second direction Y (refer to FIG. 1). The groove passages 47A are arranged side by side in the third direction Z while being spaced apart from each other (refer to FIG. 2).

As indicated by broken lines in FIG. 1, the two connecting portions 47B respectively extend from the opposite sides of the groove passages 47A in the second direction Y toward the through-holes 45, 46. The oxidant gas is introduced from the inlet manifold 95 to the groove passages 47A via one of the connecting portions 47B. The oxidant gas flowing through the groove passages 47A is discharged to the outlet manifold 96 via the other connecting portion 47B.

As shown in FIGS. 1 and 2, the second surface 40B is provided with groove passages 48A and two connecting portions 48B, through which the cooling medium flows, and second protrusions 60. In FIG. 1, the groove passages 48A and the connecting portions 48B are illustrated in a simplified manner.

The groove passages 48A are provided in the opposite surface 40b. Each of the groove passages 48A extends linearly in the second direction Y (refer to FIG. 1). The groove passages 48A are arranged side by side in the third direction Z while being spaced apart from each other (refer to FIG. 2).

As shown in FIG. 2, each groove passage 47A is formed by the back side of the protrusion positioned between two groove passages 48A adjacent to each other in the third direction Z. Also, each groove passage 48A is formed by the back side of the protrusion positioned between two groove passages 47A adjacent to each other in the third direction Z.

As shown in FIG. 1, the two connecting portions 48B respectively extend from the opposite sides of the groove passages 48A in the second direction Y toward the through-holes 43, 44. The cooling medium is introduced from the inlet manifold 93 to the groove passages 48A via one of the connecting portions 48B. The cooling medium flowing through the groove passages 48A is discharged to the outlet manifold 94 via the other connecting portion 48B.

<Second Protrusions 60>

As shown in FIGS. 1 and 2, the second protrusions 60 are provided on the outer sides of two outer-side groove passages 48a, which are the outermost groove passages 48A in the third direction Z. In the present embodiment, the second protrusions 60 are provided on the outer sides of the respective outer-side groove passages 48a (refer to FIG. 1). FIG. 2 illustrates one of the two outer-side groove passage 48a that is located on the first side in the third direction Z and the second protrusions 60 located on the outer side of that outer-side groove passage 48a.

The second protrusions 60 protrude toward the first protrusions 50 in the first direction X (see FIG. 2).

The second protrusions 60 extend in the third direction Z.

As shown in FIG. 1, the second protrusions 60 are arranged side by side in the second direction Y while being spaced apart from each other. The second protrusions 60 are provided over the entire range in which the outer-side groove passage 48a is formed in the second direction Y. In the present embodiment, the second protrusions 60 are provided at positions each corresponding to one of the first protrusions 50 in the first direction X.

As shown in FIG. 3, a distal end 61 of each second protrusion 60 includes a second depression 62 and two second bulges 63.

The second depression 62 is located at a center of the distal end 61 in the second direction Y.

As shown in FIG. 2, the second depression 62 extends in the third direction Z.

As shown in FIG. 3, the second depression 62 is curved with respect to an imaginary straight line (not shown) extending in the second direction Y in a cross-sectional view.

The two second bulges 63 are located on the opposite sides of the second depression 62 in the second direction Y.

A height H2 of the second protrusion 60 in the first direction X is in a range of 0.2 mm to 0.8 mm in the present embodiment.

The length of the distal end 61 in the second direction Y (hereinafter, referred to as a width W2) is greater than the width W1 of the first protrusion 50 (width W2>width W1). In the present embodiment, the width W2 is set to 2 mm.

A depth D2 of the second depression 62 in the first direction X is in a range of 10 μm to 50 μm in the present embodiment.

A length L of the second depression 62 in the second direction Y is greater than the width W1 of the first protrusion 50 (length L>width W1).

The distal end 51 of the first protrusion 50 is located inside the second depression 62 of the second protrusion 60. The two first bulges 53 are in contact with the second depression 62.

As shown in FIGS. 2 and 3, a gap G1, which is surrounded by the first depression 52 and the second depression 62, is formed between the first protrusion 50 and the second protrusion 60.

As shown in FIG. 2, a gasket 70 is provided on the outer side of the first protrusions 50 and the second protrusions 60 in the third direction Z. The gasket 70 provides a seal between the first separator 30 of each single cell 90 and the second separator 40 of another single cell 90 that is adjacent in the first direction X. The first protrusions 50 and the second protrusions 60 are configured to partially fill a space S formed between the gasket 70 and the outer-side groove passages 38a, 48a in the third direction Z.

Operation of the first embodiment will now be described.

Each first protrusion 50 and the corresponding second protrusion 60 are in contact with each other in a state in which the distal end 51 of the first protrusion 50 is located inside the second depression 62 of the second protrusion 60. Therefore, the gap G1, which is formed between the first depression 52 of the first protrusion 50 and the second depression 62 of the second protrusion 60, is smaller than that in a case in which the width W1 of the first protrusion 50 is equal to the width W2 of the second protrusion 60. Accordingly, the cooling medium is unlikely to flow to the outside of the first protrusion 50 and the second protrusion 60 through the gap G1.

The first embodiment has the following advantages.

(1) The first separator 30 of each single cell 90 includes the multiple first protrusions 50, which protrude toward the second separator 40 of another single cell 90 that is adjacent in the first direction X and abut the second separator 40. The first protrusions 50 are provided on the outer sides of two of the outer-side groove passages 38a, which are located on the outermost positions in the third direction Z. The first protrusions 50 are arranged side by side in the second direction Y. The second separator 40 of each single cell 90 includes the multiple second protrusions 60, which abut the first protrusions 50 of another single cell 90 that is adjacent. The second protrusions 60 each protrude toward the corresponding first protrusion 50 in the first direction X. The distal end 61 of each second protrusion 60 includes the second depression 62, which is located at the center in the second direction Y and extends in the third direction Z. The length L of the second depression 62 is greater than the width W1 of the first protrusion 50. The distal end 51 of the first protrusion 50 is located inside the second depression 62.

This configuration operates in the above-described manner. Accordingly, side flows of the cooling medium are limited.

(2) The first protrusions 50 are provided over the entire range in which the outer-side groove passage 38a is formed in the second direction Y. The second protrusions 60 are provided over the entire range in which the outer-side groove passage 48a is formed in the second direction Y.

With this configuration, the above-described advantage is achieved over the entire range in which the outer-side groove passages 38a, 48a are formed in the second direction Y. Accordingly, side flows of the cooling medium are further limited.

(3) The first separator 30 and the second separator 40 are made of metal plates.

In the separators 30, 40, which are made of metal plates, the depressions 52, 62 are formed easily in the distal ends 51, 61 of the protrusions 50, 60 during the shaping process.

In this regard, the above-described configuration limits side flows of the cooling medium that would be caused by the depressions 52, 62.

Second Embodiment

A fuel cell stack according to the second embodiment will now be described with reference to FIG. 4. Differences from the first embodiment will mainly be discussed. The same reference numerals are given to those components of the fuel cell stack according to the second embodiment that are the same as the corresponding components of the fuel cell stack according to the first embodiment, and redundant explanations are omitted. Reference numerals 1, which are obtained by adding 100 to the reference numerals  in the first embodiment, are given to components of the fuel cell stack according to the second embodiment that are equivalent to those in the fuel cell stack according to the first embodiment, and redundant explanations are omitted.

<First Protrusions 150>

Figure 4:
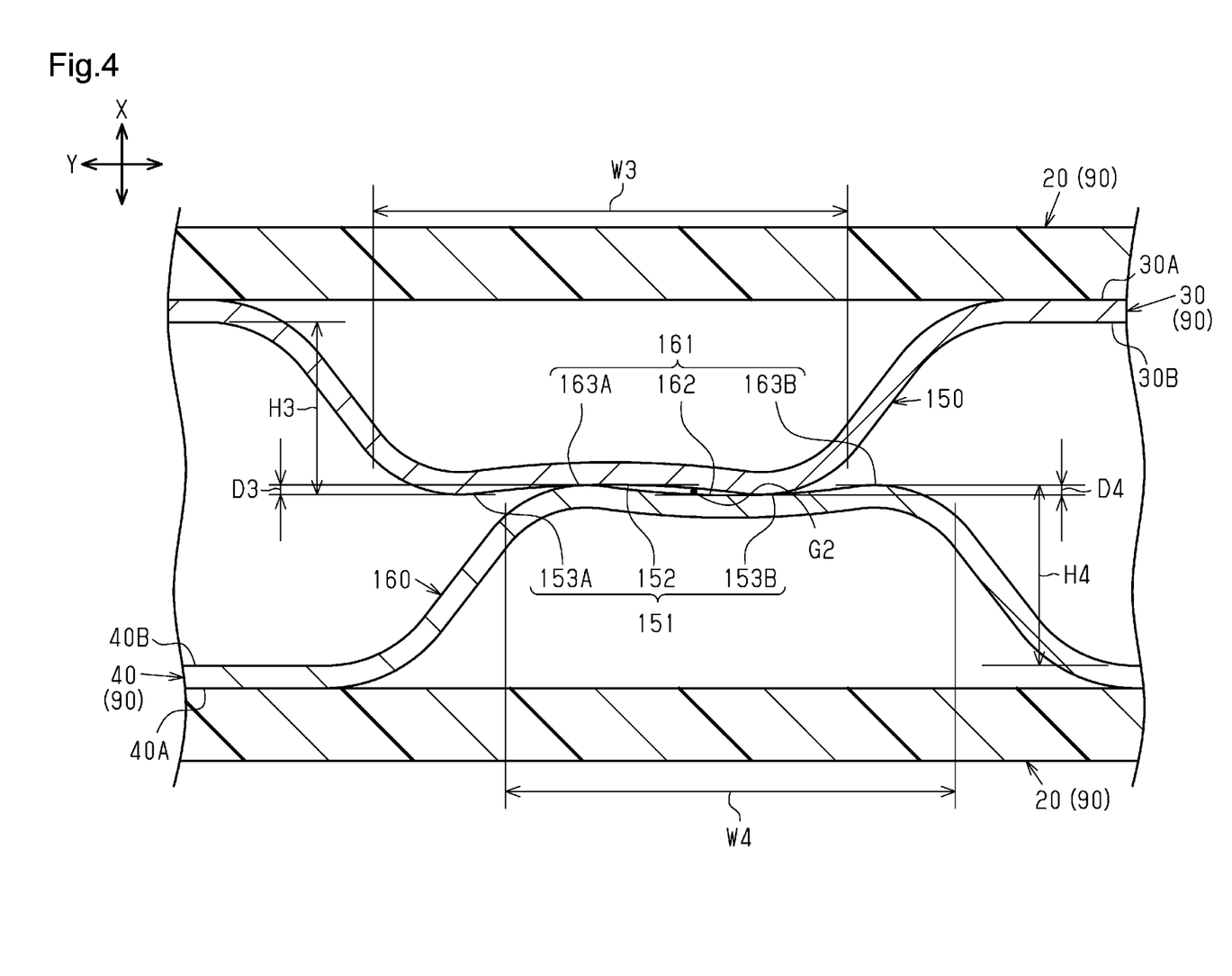
FIG. 4 is a cross-sectional view corresponding to FIG. 3, illustrating a fuel cell stack according to a second embodiment.

As shown in FIG. 4, the second surface 30B of the first separator 30 is provided with multiple first protrusions 150.

A distal end 151 of each first protrusion 150 includes a first depression 152 and two first bulges 153A, 153B.

A height H3 of the first protrusion 150 in the first direction X is in a range of 0.2 mm to 0.8 mm in the present embodiment.

A length of the distal end 151 in the second direction Y (hereinafter, referred to as a width W3) is set to 2 mm in the present embodiment.

A depth D3 of the first depression 152 in the first direction X is in a range of 10 μm to 50 μm in the present embodiment.

<Second Protrusions 160>

As shown in FIG. 4, the second surface 40B of the second separator 40 is provided with multiple second protrusions 160.

A distal end 161 of each second protrusion 160 includes a second depression 162 and two second bulges 163A, 163B.

The second protrusion 160 has the same shape as the first protrusion 150. That is, a height H4 of the second protrusion 160 in the first direction X is equal to the height H3. Also, a length of the distal end 161 in the second direction Y (hereinafter, referred to as a width W4) is equal to the width W3. A depth D4 of the second depression 162 in the first direction X is equal to the depth D3.

Of the two second bulges 163A, 163B, the second bulge 163A located on a first side in the second direction Y (the left side in the left-right direction in FIG. 4) is located inside the first depression 152 and is in contact with the first depression 152. On the other hand, of the two second bulges 163A, 163B, the second bulge 163B located on a second side in the second direction Y (the right side in the left-right direction in FIG. 4) is closer to the end on the second side than the distal end 151 of the first protrusion 150.

Also, of the two first bulges 153A, 153B, the first bulge 153B located on the second side in the second direction Y (the right in FIG. 4) is located inside the second depression 162 and is in contact with the second depression 162. On the other hand, of the two first bulges 153A, 153B, the first bulge 153A located on the first side in the second direction Y (the left side in FIG. 4) is closer to the end on the first side than the distal end 161 of the second protrusion 160.

A gap G2, which is surrounded by the first depression 152 and the second depression 162, is formed between the first protrusion 150 and the second protrusion 160.

Operation of the second embodiment will now be described.

Each first protrusion 150 and the corresponding second protrusion 160 are in contact with each other in a state in which only the second bulge 163A of the second protrusion 160 is located inside the first depression 152 of the first protrusion 150, and only the bulge 153B of the first protrusion 150 is located inside the second depression 162 of the second protrusion 160. This reduces the size of the gap G2, which is formed by the first depression 152 and the second depression 162 when the first protrusion 150 and the second protrusion 160 are in contact with each other. Accordingly, the cooling medium is unlikely to flow to the outside of the first protrusion 150 and the second protrusion 160 through the gap G2.

The second embodiment has the following advantages.

(4) The distal end 151 of each first protrusion 150 is provided with the first depression 152, which is located at the center in the second direction Y and extends in the third direction Z, and the two first bulges 153A, 153B, which are located on the opposite sides of the first depression 152 in the second direction Y. The distal end 161 of each second protrusion 160 is provided with the second depression 162, which is located at the center in the second direction Y and extends in the third direction Z, and the two second bulges 163A, 163B, which are located on the opposite sides of the second depression 162 in the second direction Y. Of the two second bulges 163A, 163B, only the second bulge 163A is located inside the first depression 152.

This configuration operates in the above-described manner. Accordingly, side flows of the cooling medium are limited.

Third Embodiment

A fuel cell stack according to the third embodiment will now be described with reference to FIGS. 5 to 7. Differences from the first embodiment will mainly be discussed. The same reference numerals are given to those components of the fuel cell stack according to the third embodiment that are the same as the corresponding components of the fuel cell stack according to the first embodiment, and redundant explanations are omitted.

<First Protrusions 250>

Figure 5:
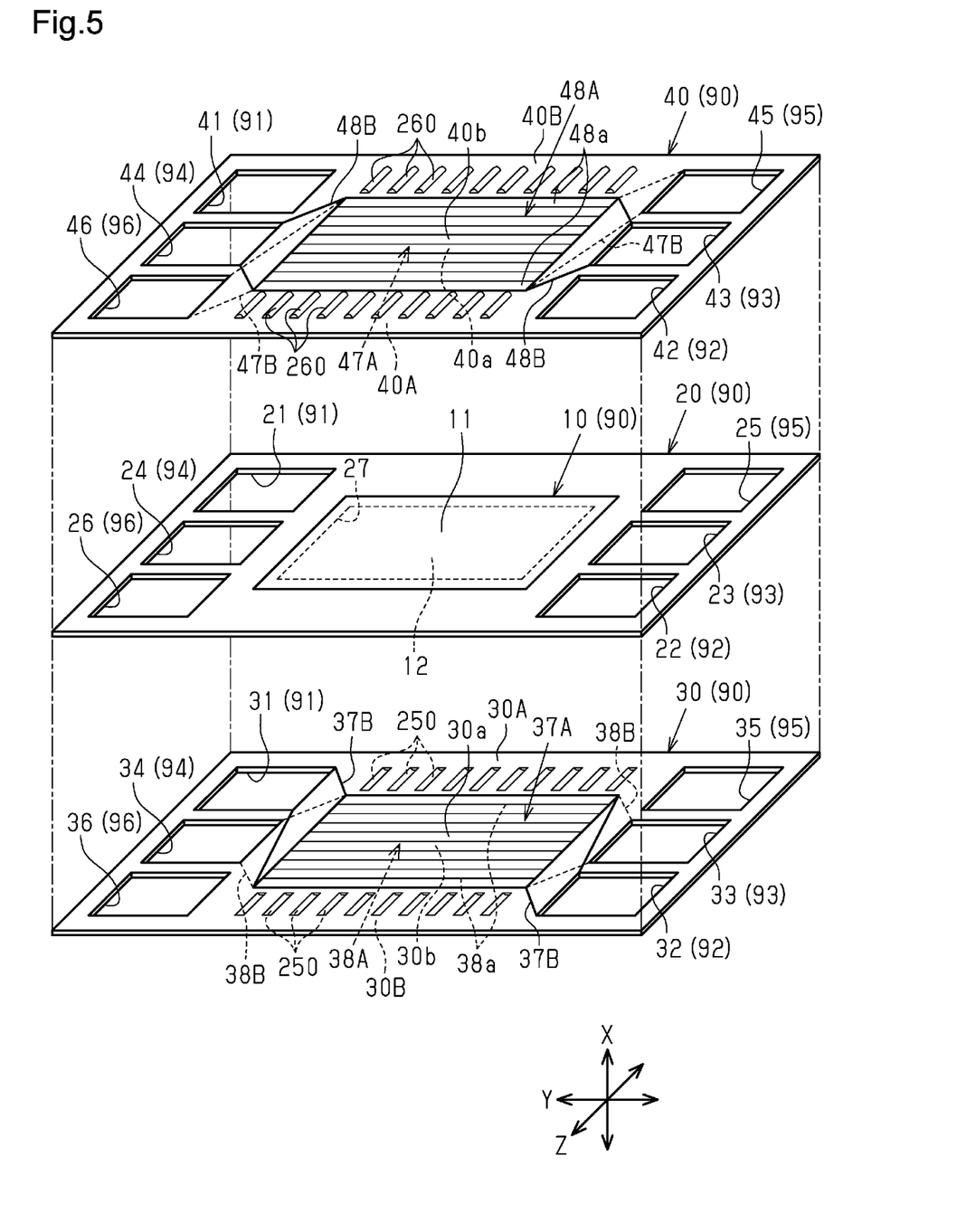
FIG. 5 is an exploded perspective view of a single cell for a fuel cell stack according to a third embodiment.
Figure 6:
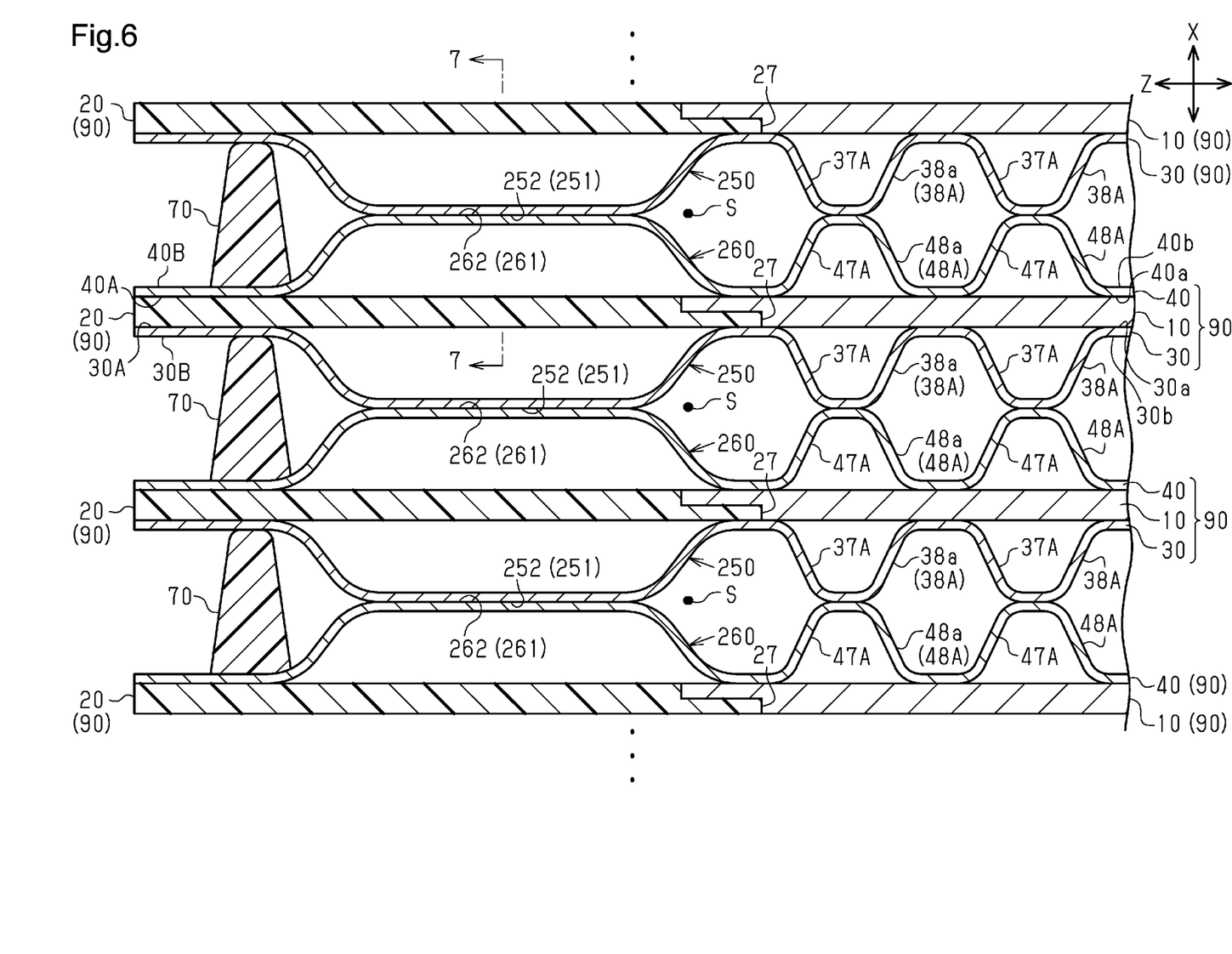
FIG. 6 is a cross-sectional view showing the fuel cell stack according to the third embodiment.

As shown in FIGS. 5 and 6, the second surface 30B of the first separator 30 is provided with multiple first protrusions 250. The first protrusions 250 are provided on the outer sides of two outer-side groove passages 38a, which are the outermost groove passages 38A in the third direction Z. In the present embodiment, the first protrusions 250 are provided on the outer sides of the respective outer-side groove passages 38a (refer to FIG. 5). The outer side in the third direction Z refers to a side away from the center of the single cell 90 in the third direction Z. FIG. 6 illustrates the outer-side groove passage 38a located on the first side in the third direction Z (the back side of the sheet of FIG. 5) of the two outer-side groove passages 38a and the first protrusions 250 located on the outer side of that outer-side groove passage 38a.

The first protrusions 250 protrude from the single cell 90 toward the second separator 40 of another single cell 90 that is adjacent in the first direction X (see FIG. 6).

The first protrusions 250 extend in the third direction Z.

As shown in FIG. 5, the first protrusions 250 are arranged side by side in the second direction Y while being spaced apart from each other. The first protrusions 250 are provided over the entire range in which the outer-side groove passage 38a is formed in the second direction Y.

Figure 7:
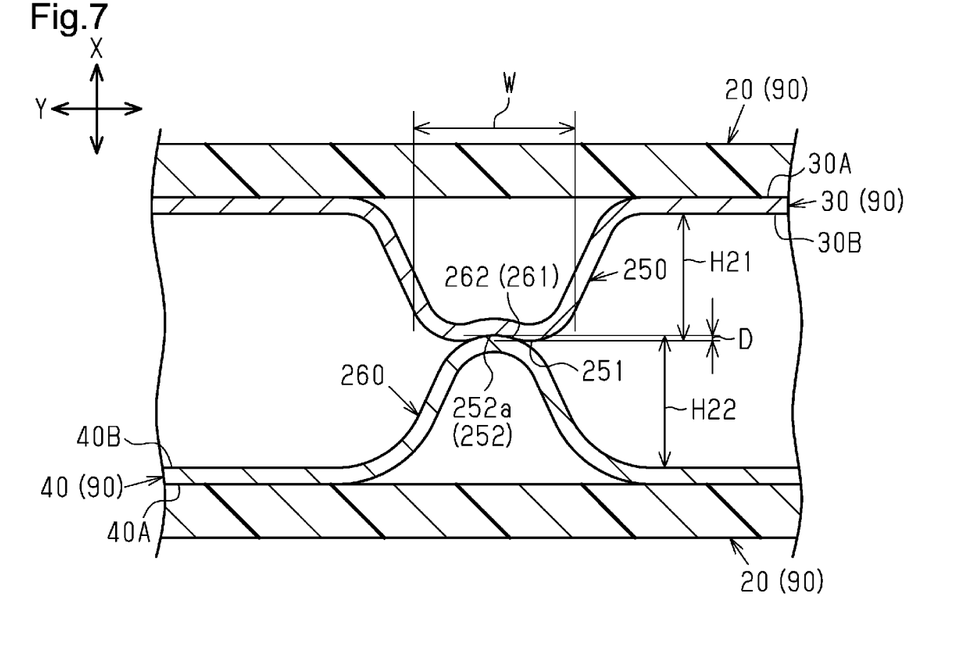
FIG. 7 is a cross-sectional view taken along line 7-7 of FIG. 6.

As shown in FIG. 7, a distal end 251 of each first protrusion 250 includes a depression 252.

The depression 252 is located at a center of the distal end 251 in the second direction Y.

As shown in FIG. 6, the depression 252 extends in the third direction Z.

As shown in FIG. 7, the depression 252 is curved with respect to an imaginary straight line (not shown) extending in the second direction Y in a cross-sectional view.

A height H21 of the first protrusion 250 in the first direction X is in a range of 0.2 mm to 0.8 mm in the present embodiment.

A width W of the distal end 251 in the second direction Y is in a range of 0.5 mm to 2 mm in the present embodiment.

A depth D of the depression 252 in the first direction X is in a range of 10 μm to 50 μm in the present embodiment.

<Second Protrusions 260>

As shown in FIGS. 5 and 6, the second surface 40B of the second separator 40 is provided with multiple second protrusions 260. The second protrusions 260 are provided on the outer sides of two outer-side groove passages 48a, which are the outermost groove passages 48A in the third direction Z. In the present embodiment, the second protrusions 260 are provided on the outer sides of the respective outer-side groove passages 48a (refer to FIG. 5). FIG. 6 illustrates one of the two outer-side groove passage 48a that is located on the first side in the third direction Z and the second protrusions 260 located on the outer side of that outer-side groove passage 48a.

The second protrusions 260 protrude toward the first protrusions 250 in the first direction X (see FIG. 6).

The second protrusions 260 extend in the third direction Z.

As shown in FIG. 5, the second protrusions 260 are arranged side by side in the second direction Y while being spaced apart from each other. The second protrusions 260 are provided over the entire range in which the outer-side groove passage 48a is formed in the second direction Y. In the present embodiment, the second protrusions 260 are provided at positions each corresponding to one of the first protrusions 250 in the first direction X.

As shown in FIG. 7, a distal end 261 of the second protrusion 260 is curved along the depression 252 in a cross-sectional view.

The distal end 261 includes a projection 262, which projects toward a bottom surface 252a of the depression 252. In the present embodiment, a portion of the distal end 261 that is located inside the depression 252 and is in contact with the depression 252 is the projection 262. The projection 262 is curved along the depression 252 in a cross-sectional view. The projection 262 is fit to the depression 252 without a gap.

As shown in FIG. 6, the projection 262 extends in the third direction Z.

As shown in FIG. 7, a height H22 of the second protrusion 260 in the first direction X is in a range of 0.2 mm to 0.8 mm in the present embodiment.

As shown in FIG. 6, a gasket 70 is provided on the outer sides of the first protrusions 250 and the second protrusions 260 in the third direction Z. The gasket 70 provides a seal between the separator 30 of the single cell 90 and the second separator 40 of another single cell 90 that is adjacent in the first direction X. The first protrusions 250 and the second protrusions 260 are configured to partially fill a space S formed between the gasket 70 and the outer-side groove passages 38a, 48a in the third direction Z.

An operation of the third embodiment will now be described.

The first protrusion 250 and the second protrusion 260 are in contact with each other in a state in which the distal end 261 of the second protrusion 260 is located inside the depression 252 of the first protrusion 250. The projection 262 of the distal end 261 of the second protrusion 260 projects toward the bottom surface 252a of the depression 252. Therefore, a gap is less likely to be formed between the depression 252 of the first protrusion 250 and the second protrusion 260 than in a case in which a depression is provided in the distal end 261 of the second protrusion 260 or in a case in which the distal end 261 of the second protrusion 260 is flat. Accordingly, the cooling medium is unlikely to flow to the outside of the first protrusion 250 and the second protrusion 260 through a gap.

The third embodiment has the following advantages.
(5) The first separator 30 of each single cell 90 includes the multiple first protrusions 250, which protrude toward the second separator 40 of another single cell 90 that is adjacent in the first direction X and abut the second separator 40. The first protrusions 250 are provided on the outer sides of two of the outer-side groove passages 38a, which are located on the outermost positions in the third direction Z. The first protrusions 250 are arranged side by side in the second direction Y. The second separator 40 of each single cell 90 includes the multiple second protrusions 260, which abut the first protrusions 250 of another single cell 90 that is adjacent. The second protrusions 260 each protrude toward the corresponding first protrusion 250 in the first direction X. The distal end 251 of each first protrusion 250 includes the depression 252, which is located at the center in the second direction Y and extends in the third direction Z. The distal end 261 of the second protrusion 260 includes the projection 262. The projection 262 is located inside the depression 252 and projects toward the bottom surface 252a of the depression 252.

This configuration operates in the above-described manner. Accordingly, side flows of the cooling medium are limited.
(6) The depression 252 is curved with respect to an imaginary straight line extending in the second direction Y. The projection 262 is curved along the depression 252 and is in contact with the depression 252.

With this configuration, a gap is hardly formed between the depression 252 of the first protrusion 250 and the second protrusion 260. Accordingly, side flows of the cooling medium are further limited.
(7) The first protrusions 250 are provided over the entire range in which the outer-side groove passage 38a is formed in the second direction Y. The second protrusions 260 are provided over the entire range in which the outer-side groove passage 48a is formed in the second direction Y.

With this configuration, the above-described advantage is achieved over the entire range in which the outer-side groove passages 38a, 48a are formed in the second direction Y. Accordingly, side flows of the cooling medium are further limited.
(8) The first separator 30 and the second separator 40 are made of metal plates.

In the separator 30, which is made of a metal plate, the depression 252 is formed easily in the distal end 251 of the first protrusion 250 during the shaping process. In the separator 40, which is made of a metal plate, a depression is formed easily in the distal end 261 of the second protrusion 260 during the shaping process.

In this regard, the above-described configuration limits side flows of the cooling medium that would be caused by the depressions.

Modifications

The above-described embodiments may be modified as follows. The above-described embodiments and the following modifications can be combined as long as the combined modifications remain technically consistent with each other.

Common Modifications of First to Third Embodiments

The shapes of the inlet manifolds 91, 93, 95 and the outlet manifolds 92, 94, 96 are not limited to rectangular shapes in plan view as in the above-described embodiments, but may be stadium shapes in plan view, for example.

The flows of the reactant gas and the cooling medium through the manifolds 91, 92, 93, 94, 95, 96 are not limited to those described in the above-described embodiments. For example, the manifold 96 may be used as an inlet manifold for the oxidant gas, and the manifold 95 may be used as an outlet manifold for the oxidant gas. Accordingly, the manifold 94 may be used as an inlet manifold for the cooling medium, and the manifold 93 may be used as an outlet manifold for the cooling medium. That is, the oxidant gas that flows through the groove passages 47A and the cooling medium that flows through the groove passages 38A, 48A may flow in the same direction as the fuel gas flowing through the groove passages 37A.

The groove passages 37A (38A) are not limited to extending linearly in the second direction Y as in the above-described embodiments. For example, the groove passages 37A (38A) may extend in wavy shapes in a planar direction of the facing surface 30a (the opposite surface 30b).

The groove passages 47A (48A) are not limited to extending linearly in the second direction Y as in the above-described embodiments. For example, the groove passages 47A (48A) may extend in wavy shapes in a planar direction of the facing surface 40a (the opposite surface 40b).

The separators 30, 40 do not necessarily need to be formed by pressing metal plates, but may be formed by cutting or etching.

The material for the separators 30, 40 is not limited to titanium or stainless steel, but may be aluminum or carbon.

The first separator according to the present disclosure is not limited to an anode-side separator as in the above-described embodiments, but may be used as a cathode-side separator. In this case, the second separator according to the present disclosure is used as an anode-side separator.

Modifications of First and Second Embodiments

The shapes of the first protrusion 50 and the second protrusion 60 are not limited to the ones described in the first embodiment. For example, the width W1 of the first protrusion 50 may be less than or greater than 1 mm. Also, the width W2 of the second protrusion 60 is not limited to 2 mm, but may be changed as long as the length L of the second depression 62 is greater than the width W1. Further, the height H1 of the first protrusion 50 may be less than 0.2 mm or greater than 0.8 mm. In this case, the height H2 of the second protrusion 60 is not limited to the range of 0.2 mm to 0.8 mm, but may be changed in correspondence with the height H1 of the first protrusion 50.

The second protrusion 160 is not limited to the configuration in which only the second bulge 163A of the two second bulges 163B, 163A is located inside the first depression 152 as illustrated in the second embodiment. The second protrusion 160 may be modified as long as only one of the second bulges 163A, 163B is located inside the first depression 152.

The shapes of the first protrusion 150 and the second protrusion 160 are not limited to the ones described in the second embodiment. For example, the width W3 of the first protrusion 150 and the width W4 of the second protrusion 160 each may be less than or greater than 2 mm. The shapes of the first protrusion 150 and the second protrusion 160 do not necessarily need to be the same. The respective shapes may be changed as long as only one of the second bulges 163A, 163B is located inside the first depression 152. For example, the width W3 may be less than or greater than the width W4. Also, the height H3 may be less than 0.2 mm or greater than 0.8 mm. In this case, the height H4 is not limited to the range of 0.2 mm to 0.8 mm, but may be changed in correspondence with the height H3 of the first protrusion 150.

The first depression 52 (152) and the second depression 62 (162) do not necessarily need to be curved in a cross-sectional view with respect to an imaginary straight line extending in the second direction Y. For example, the first depression 52 (152) may have a flat bottom surface extending in a planar direction of the second surface 30B. The second depression 62 (162) may be modified in the same manner.

The first protrusion 50 is not limited to the one including the first depression 52 and the two first bulges 53. For example, the distal end 51 of the first protrusion 50 may have a flat shape extending in a planar direction of the second surface 30B as long as the length L of the second depression 62 is greater than the width W1 of the first protrusion 50.

The first protrusions 50 (150) do not necessarily need to be provided on the outer sides of the respective outer-side groove passages 38a. The first protrusions 50 (150) may be provided on the outer side of one of the outer-side groove passages 38a. In this case, the second protrusions 60 (160) are not limited to being provided on the outer sides of both of the outer-side groove passages 48a, and the arrangement thereof may be changed in accordance with the first protrusions 50 (150).

The fuel cell stack is not limited to the one in which one second protrusion 60 (160) is provided at a position corresponding to each of the first protrusions 50 (150) in the first direction X, and some of the second protrusions 60 (160) may be omitted. In this case, the separator 30 includes first protrusions 50 (150) that do not face the second protrusions 60 (160) in the first direction X. The first protrusions 50 (150) that do not face the second protrusions 60 (160) may be any protrusion as long as they are in contact with the second surfaces 40B of the separator 40.

Modifications of Third Embodiment

The shape of the first protrusion 250 is not limited to the one described in the third embodiment. For example, the height H21 of the first protrusion 250 may be less than 0.2 mm or greater than 0.8 mm. In this case, the height H22 of the second protrusion 260 is not limited to the range of 0.2 mm to 0.8 mm, but may be changed in correspondence with the height H21 of the first protrusion 250. The width W of the first protrusion 250 is not limited to the range of 0.5 mm to 2 mm, but may be less than 0.5 mm or greater than 2 mm as long as the advantages of the present disclosure are achieved.

Figure 8:
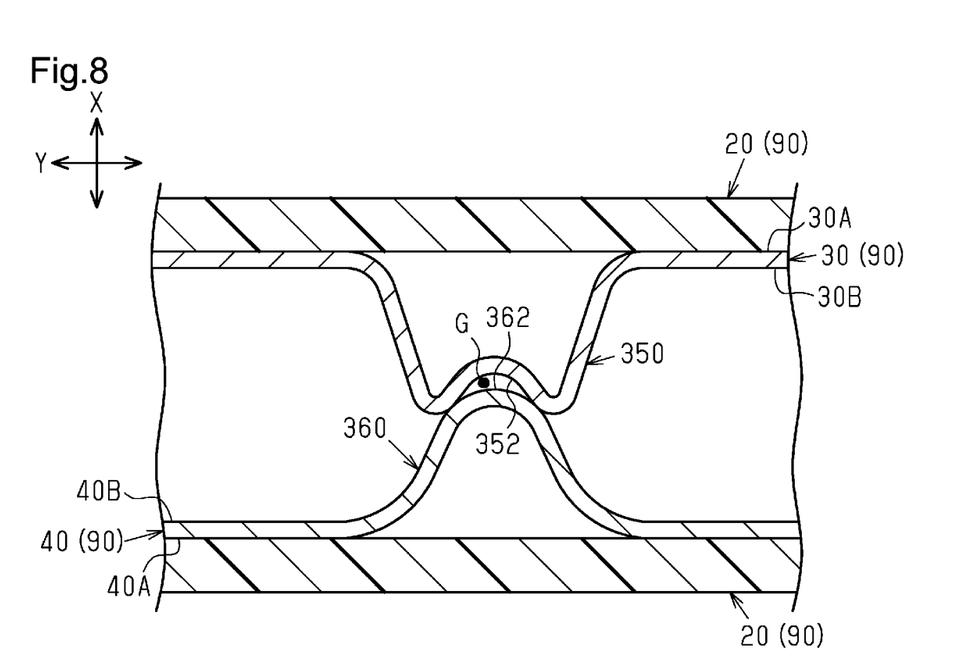
FIG. 8 is a cross-sectional view corresponding to FIG. 7, illustrating a fuel cell stack according to a modification.

The first separator 30 and the second separator 40 are not limited to those in which the depression 252 of the first protrusion 250 and the projection 262 of the second protrusion 260 are fit to each other without a gap. For example, as shown in FIG. 8, the separator 30 and the separator 40 may have a first protrusion 350 and a second protrusion 360, which respectively have a depression 352 and a projection 362. A gap G is formed between the depression 352 and the projection 362. In this case, the projection 362 is located inside and is in contact with depression 352.

The distal end 261 of the second protrusion 260 does not necessarily need to be curved along the depression 252 in a cross-sectional view. For example, the distal end 261 of the second protrusion 260 may have a flat portion extending in a planar direction of the second surface 40B and a projection projecting from the flat portion toward the bottom surface 252a of the depression 252.

The depression 252 does not necessarily need to be curved with respect to an imaginary straight line extending in the second direction Y in a cross-sectional view. For example, the depression 252 may have a flat bottom surface extending in a planar direction of the second surface 30B.

The first protrusions 250 do not necessarily need to be provided on the outer sides of the respective outer-side groove passages 38a. The first protrusions 250 may be provided on the outer side of one of the outer-side groove passages 38a. In this case, the second protrusions 260 are not limited to being provided on the outer sides of both of the outer-side groove passages 48a, and the arrangement thereof may be changed in accordance with the first protrusions 250.

The fuel cell stack is not limited to the one in which one second protrusion 260 is provided at a position corresponding to each of the first protrusions 250 in the first direction X, and some of the second protrusions 260 may be omitted. In this case, the separator 30 includes first protrusions 250 that do not face the second protrusions 260 in the first direction X. The first protrusions 250 that do not face the second protrusions 260 may be any protrusion as long as they are in contact with the second surfaces 40B of the separator 40.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A fuel cell stack, comprising single cells stacked in a first direction, wherein each single cell includes:
a power generating unit; and
a first separator and a second separator that hold the power generating unit between the first separator and the second separator,
the first separator and the second separator each include:
a facing surface that faces the power generating unit; and
an opposite surface that is located on a side opposite to the facing surface,
the opposite surface of the first separator and the opposite surface of the second separator are each provided with groove passages that extend in a second direction, a cooling medium flowing through the groove passages,
the first separator of each single cell includes first protrusions that protrude toward the second separator of another single cell that is adjacent in the first direction, the first protrusions abutting the second separator,
the groove passages include groove passages that are located at outermost positions in a third direction, the third direction intersecting with both of the first direction and the second direction,
the first protrusions are provided on an outer side of at least one of the groove passages that are located at the outermost positions in the third direction, the first protrusions being arranged side by side in the second direction,
the second separator of each single cell includes second protrusions that abut the first protrusions of another single cell that is adjacent,
the second protrusions each protrude toward the corresponding one of the first protrusions in the first direction,
a distal end of each second protrusion includes a depression that is located at a center in the second direction and extends in the third direction,
a length of the depression in the second direction is greater than a length of the first protrusion in the second direction, and
a distal end of each first protrusion is located inside the depression.

2. The fuel cell stack according to claim 1, wherein the first protrusions and the second protrusions are provided over an entire range in which the groove passages are formed in the second direction.

3. The fuel cell stack according to claim 1, wherein the first separator and the second separator are made of metal plates.

4. A fuel cell stack, comprising single cells stacked in a first direction, wherein
each single cell includes:
a power generating unit; and
a first separator and a second separator that hold the power generating unit between the first separator and the second separator,
the first separator and the second separator each include:
a facing surface that faces the power generating unit; and
an opposite surface that is located on a side opposite to the facing surface,
the opposite surface of the first separator and the opposite surface of the second separator are each provided with groove passages that extend in a second direction, a cooling medium flowing through the groove passages,
the first separator of each single cell includes first protrusions that protrude toward the second separator of another single cell that is adjacent in the first direction, the first protrusions abutting the second separator,
the groove passages include groove passages that are located at outermost positions in a third direction, the third direction intersecting with both of the first direction and the second direction,
the first protrusions are provided on an outer side of at least one of the groove passages that are located at the outermost positions in the third direction, the first protrusions being arranged side by side in the second direction,
the second separator of each single cell includes second protrusions that abut the first protrusions of another single cell that is adjacent,
the second protrusions each protrude toward the corresponding one of the first protrusions in the first direction,
a distal end of each first protrusion is provided with a first depression and two first bulges, the first depression being located at a center in the second direction and extending in the third direction, and the two first bulges being located on opposite sides of the first depression in the second direction,
a distal end of each second protrusion is provided with a second depression and two second bulges, the second depression being located at a center in the second direction and extending in the third direction, and the two second bulges being located on opposite sides of the second depression in the second direction, and
only one of the two second bulges is located inside the first depression.

5. The fuel cell stack according to claim 4, wherein the first protrusions and the second protrusions are provided over an entire range in which the groove passages are formed in the second direction.

6. The fuel cell stack according to claim 4, wherein the first separator and the second separator are made of metal plates.

7. A fuel cell stack, comprising single cells stacked in a first direction, wherein
each single cell includes:
a power generating unit; and
a first separator and a second separator that hold the power generating unit between the first separator and the second separator,
the first separator and the second separator each include:
a facing surface that faces the power generating unit; and
an opposite surface that is located on a side opposite to the facing surface,
the opposite surface of the first separator and the opposite surface of the second separator are each provided with groove passages that extend in a second direction, a cooling medium flowing through the groove passages,
the first separator of each single cell includes first protrusions that protrude toward the second separator of another single cell that is adjacent in the first direction, the first protrusions abutting the second separator,
the groove passages include groove passages that are located at outermost positions in a third direction, the third direction intersecting with both of the first direction and the second direction,
the first protrusions are provided on an outer side of at least one of the groove passages that are located at the outermost positions in the third direction, the first protrusions being arranged side by side in the second direction, the second separator of each single cell includes second protrusions that abut the first protrusions of another single cell that is adjacent, the second protrusions each protrude toward the corresponding one of the first protrusions in the first direction, a distal end of each first protrusion includes a depression that is located at a center in the second direction and extends in the third direction, a distal end of each second protrusion includes a projection, and the projection is located inside the depression and projects toward a bottom surface of the depression.

8. The fuel cell stack according to claim 7, wherein the depression is curved with respect to an imaginary straight line extending in the second direction, and the projection is curved along the depression and is in contact with the depression.

9. The fuel cell stack according to claim 7, wherein the first protrusions and the second protrusions are provided over an entire range in which the groove passages are formed in the second direction.

10. The fuel cell stack according to claim 7, wherein the first separator and the second separator are made of metal plates.

* * * * *